United States Patent [19]

Schwartau et al.

[11] 4,207,837
[45] Jun. 17, 1980

[54] APPARATUS FOR A DAIRY BARN

[76] Inventors: Merle C. Schwartau; Daniel J. Schwartau; David R. Schwartau, all of Rte. 4, Red Wing, Minn. 55066

[21] Appl. No.: 935,348

[22] Filed: Aug. 21, 1978

[51] Int. Cl.² .............................................. A01K 1/12
[52] U.S. Cl. .................... 119/14.03; 119/27; 119/28
[58] Field of Search ................. 119/14.03, 27, 28

[56] References Cited

U.S. PATENT DOCUMENTS

| | | | |
|---|---|---|---|
| 2,472,122 | 6/1949 | Polivka | 119/14.03 X |
| 2,730,071 | 1/1956 | Merritt et al. | 119/14.03 X |
| 3,016,877 | 1/1962 | Sparr | 119/14.03 |
| 3,392,709 | 7/1968 | Janson et al. | 119/27 |
| 3,456,619 | 7/1969 | Janson et al. | 119/27 |

Primary Examiner—Hugh R. Chamblee
Attorney, Agent, or Firm—Dorsey, Windhorst, Hannaford, Whitney & Halladay

[57] ABSTRACT

An apparatus used in a dairy barn that facilitates access to the dairy animals for milking, which comprises a fixed platform on which the animals stand during milking, a fixed support surface adjacent and lower than the platform, a floor adjacent the platform and above the support surface that is selectively elevatable between a raised position and a lowered position, means for raising and lowering the floor, and means for restraining the animals on the platform so that they may be milked by the operator. The platform has a configuration that, when the floor is in its lowered position, allows the operator to milk the animals while he is standing substantially upright. The animals are able to approach or leave the platform when the floor is in its raised position.

9 Claims, 5 Drawing Figures

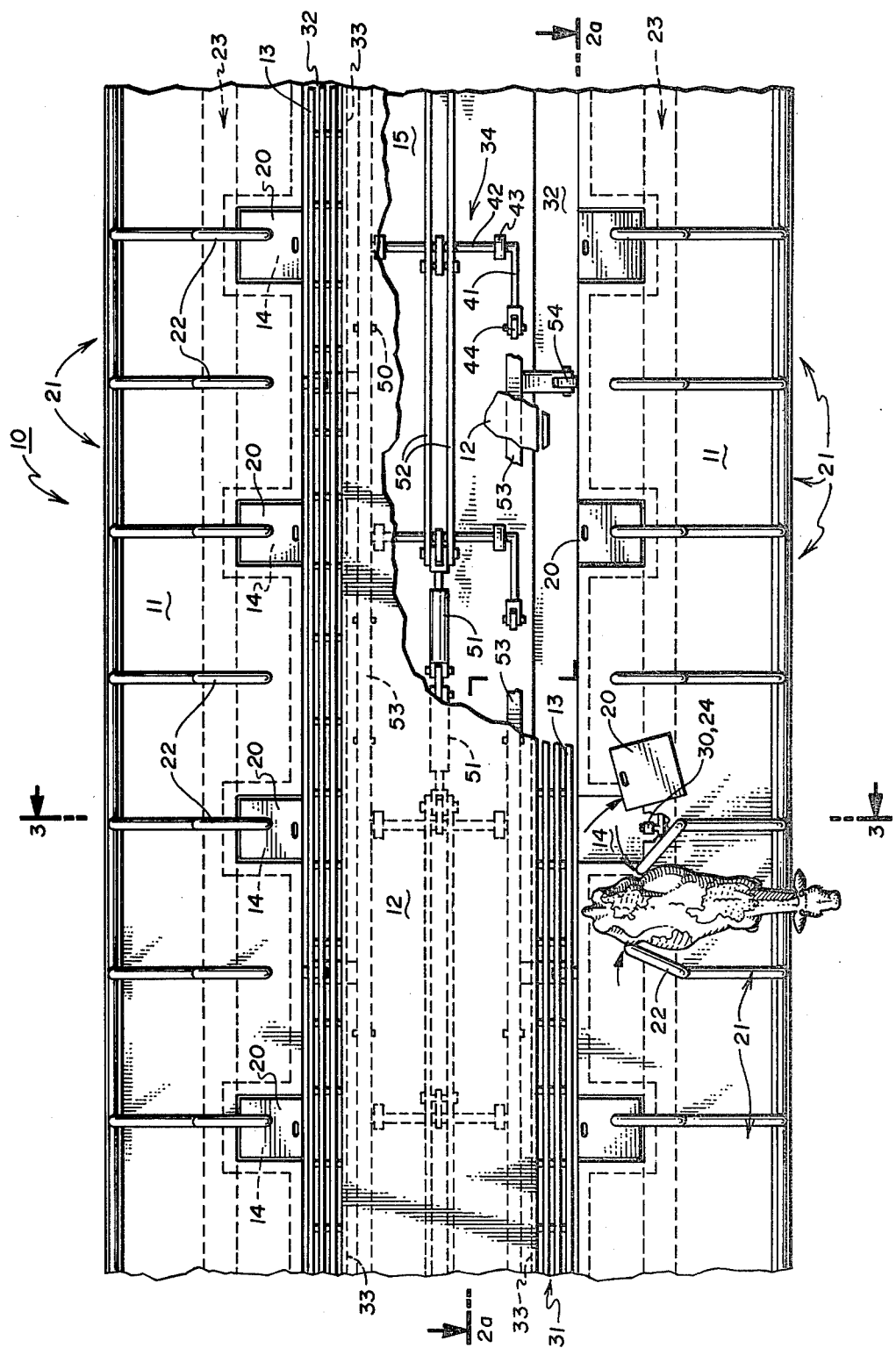

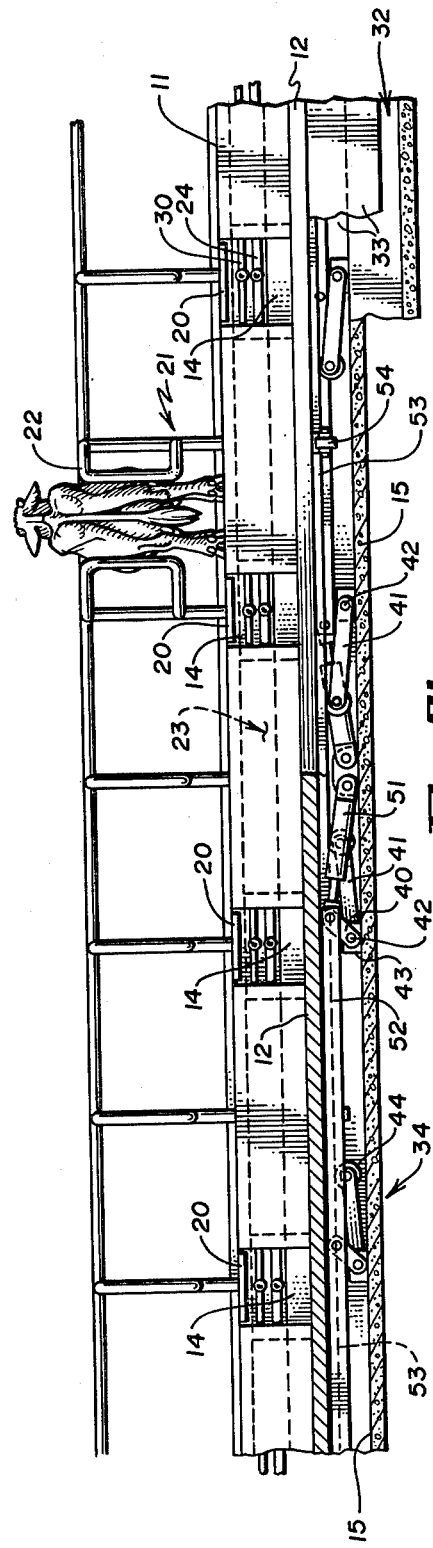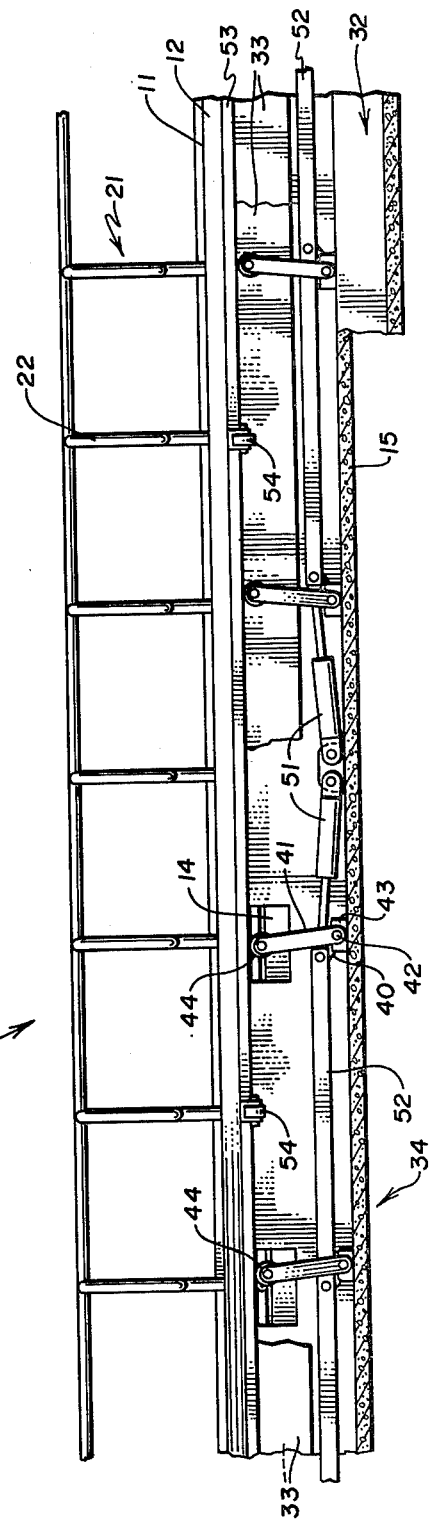

APPARATUS FOR A DAIRY BARN

BACKGROUND OF THE INVENTION

1. Field of the Invention

The present invention relates to an apparatus used in a dairy barn that facilitates access to the dairy animals for milking and, more particularly, to a particular milking platform configuration and a selectively elevatable dairy barn floor.

2. Description of the Prior Art

It has long been recognized that the milking of dairy animals is facilitated if the operator is able to work from a level below the level of the cows during milking. Such a design permits the operator to attach the teat cup cluster to the cow without stooping or bending. As a result, the effort expended to milk a herd of dairy animals is decreased and the efficiency of the entire operation is increased. Numerous arrangements are known in the art for accomplishing these goals. Most such arrangements, however, suffer a number of disadvantages. The most common arrangement is that of the traditional milking parlor having one or more elevated, fixed platforms with an operator space or a floor located between each platform. While the difference in elevation between the fixed platform and the operator space facilitates the milking operation, unless a whole series of platforms are employed, the milking process is quite tedious, requiring one or two cows to be herded onto the platforms at a time. A series of such platforms situated inside a barn is impractical if one wishes to use the milking area as the barn during the entire year.

Because milking parlors confine the dairy animals only during milking, the animals are normally free to move about in the barn or yard. Their unrestricted movement makes individualized care of the animals more difficult. It also means that the animals require more cleaning prior to milking than they would require had they been confined to stalls.

Many milking parlors also have suffered from problems associated with the maintenance of sanitary conditions on the platforms. The milking plaforms are separated by operator areas, generally making it infeasible to extend a manure gutter the length of the platforms. Because of the sanitation problem, the milk line and vacuum line to which the milking equipment is attached have generally been elevated to a position over the cow. While such a placement of the lines eliminates the contamination problem, it increases the mechanical requirements associated with the milking operation. Specifically, a higher pressure differential is required to force the milk from the cow to the overhead line. An alternate approach has been to place the milk and vacuum lines on the floor in the manger area where the sanitation problems are not as serious. However, such a placement makes the task of the operator more difficult because he must move to the front of the cow to attach the milking equipment to the lines and then move to the rear of the cow to attach the milking equipment to the cow. The additional movement required of the operator slows the milking operation significantly.

In Peel (U.S. Pat. No. 4,006,712) a milking apparatus is disclosed which includes vertically movable platforms on which the cows are supported during milking. While the disclosed configuration apparently increases the efficiency of the operator because the bending requirement is eliminated, the apparatus cannot be used as a barn. Furthermore, each vertically movable platform has associated with it an entire set of hydraulic equipment. Finally, the configuration does not permit the placement of milk and vacuum lines below platform level.

SUMMARY OF THE INVENTION

The apparatus used in a dairy barn that facilitates access to the dairy animals for milking includes a fixed platform on which the animals stand during milking. The platform has a configuration that allows the operator to position himself to milk the animals. Adjacent and lower than the platform is a fixed support surface. A floor adjacent the platform and above the support surface is selectively elevatable between a raised position and a lowered position. When the floor is in its raised position, the animals are able to approach or leave the platform by means of the floor, which is substantially level with the platform. When the floor is in its lowered position, the floor is lower than the platform and the operator is able to milk the animals while he is standing substantially upright. Vertical movement of the floor is effected by means for raising and lowering the floor. During milking, means for restraining the animals on the platform are employed.

In its specific preferred form, the floor comprises a center alley between two substantially level platforms. Recessed along the length of each platform and adjacent the floor are milking nooks that allow the operator to milk two animals from a single nook. When the milking nooks are not in use, they are covered by removable nook covers. Means for restraining the animals includes a plurality of platform-mounted stalls; each stall has a hinged partition that confines the animal so that it may be safely milked by the operator.

The center alley floor contains a gutter grate along each of its longitudinal edges. A manure gutter lies beneath each gutter grate and adjacent and below the level of the support surface. Depending from the floor are manure deflectors, which ensure that manure falling through the gutter grates enters the manure gutters.

The means for raising and lowering the floor includes a plurality of lift assemblies, a hydraulic ram pivotally mounted at its base to the support surface, and a lift arm power linkage pivotally connected to a portion of each assembly that is located to one side of the lift arm power linkage. Each lift assembly includes a center lift arm, which is pivotally connected to the lift arm power linkage, two outer lift arms, a shaft to which the center and outer lift arms are welded at a fixed angle with respect to each other, lift arm shaft bearings mounted on the support surface and in which the shaft is mounted, lift arm rollers rotatably attached to the free ends of the outer lift arms, and lift arm stops affixed to the bottom of the floor. One end of the lift arm power linkage is pivotally connected to the hydraulic ram so that the floor may be selectively elevated by the outer lift arms in response to movement of the lift arm power linkage by the hydraulic ram. The raised position of the floor is limited by the lift arm stops, which prevent further movement of the outer lift arms. Tracks are secured to the bottom of the floor to guide the lift arm rollers and laterally disposed guide rollers extend from the bottom of the floor to guide the floor as it is raised and lowered vertically.

The invention further provides a flue in which are housed a stainless steel milk line and a vacuum line. The flue is disposed beneath the platform and above the support surface so that the milk flows from the animal to the milk line by gravity and so that the flue is readily accessible to the operator. The flue is disposed in front of the animal's hind legs during milking so that the milk line and vacuum line are not contaminated by manure.

The present invention minimizes or eliminates the previously mentioned problems that existed in the prior art. By lowering the floor with respect to the fixed platforms, the operator is able to perform the milking with greater efficiency. The efficiency is further enhanced by the convenient placement of the milk and vacuum lines adjacent the milking nooks. The operator does not need to move to connect the milking equipment to the lines, unlike the situation when the lines are placed in the manger area. The mechanical efficiency of the milking procedure also is improved. By placing the lines below the cow but above grade, the pressure differential required to force the milk from the cow into the milking line is reduced. Because the lines are disposed forwardly of the hind legs of the cow, the sanitation problems ordinarily associated with the placement of such lines in a milking platform are obviated. Finally, the milking apparatus for a dairy barn is constructed so that its use is not confined to just the milking operation. The barn can be used the entire year for multiple purposes.

Other features and modifications of the invention will be apparent from the following detailed description and claims.

BRIEF DESCRIPTION OF THE DRAWINGS

In the drawings which form a part of this application, and in which like numerals refer to like parts;

FIG. 1 is a plan view of the present invention;

FIG. 2a is a side view of the same apparatus with the floor in its raised position;

FIG. 2b is a side view of the same apparatus with the floor in its lowered position;

DESCRIPTION OF THE PREFERRED EMBODIMENT

Figure 3:
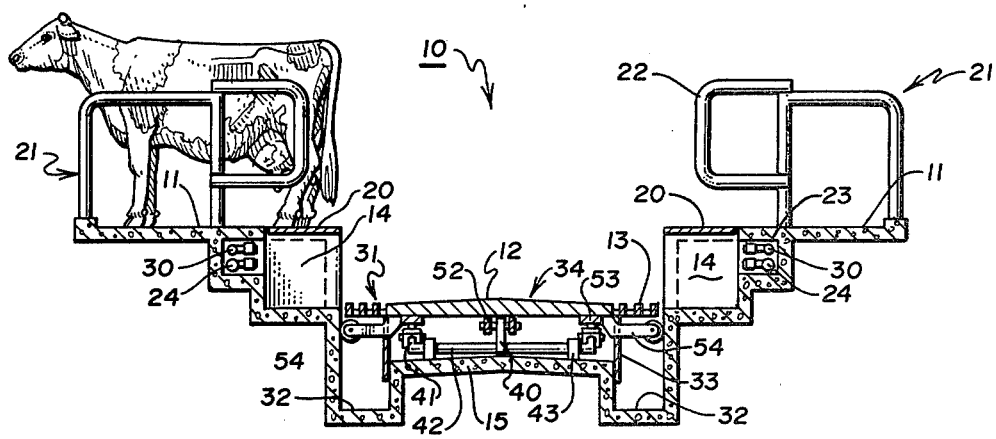
FIG. 3 is a sectional elevation taken along line 3—3 of FIG. 2b with the floor in its lowered position.
Figure 4:
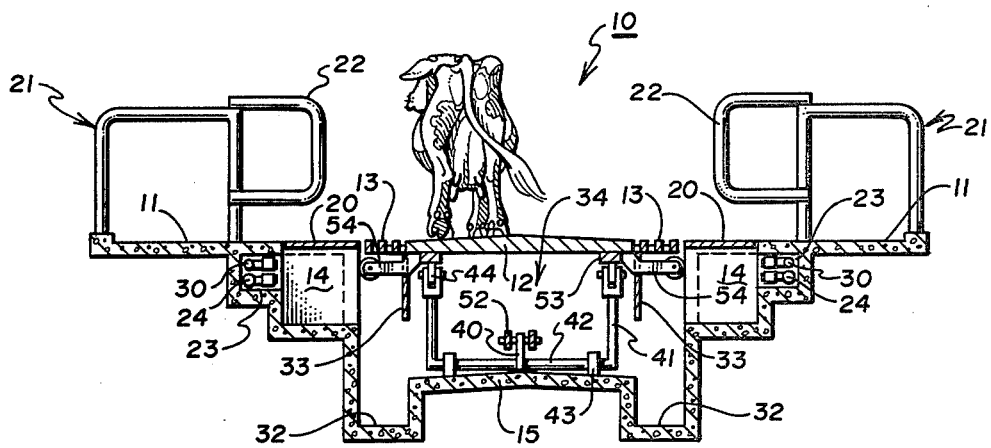
FIG. 4 is a sectional elevation taken along line 3—3 of FIG. 2a with the floor in its raised position.

FIGS. 1-4 of the drawings illustrate an apparatus 10 for a dairy barn made in accordance with and embodying the principles of the present invention. The apparatus comprises two fixed concrete platforms 11 that extend along both sides of the barn and a steel floor or center alley 12 that can be selectively elevated from a support surface 15. Recessed in the platforms 11 along the longitudinal edges 13 of the center alley 12 are milking nooks 14. The milking nooks 14, when not in use, are covered by the removable nook covers 20.

During milking, the animals stand on the fixed platforms 11. The animals are restrained from moving during milking by the means for restraining animals or stalls 21 and neck chains (not shown); a row of stalls 21 is arranged on each of the platforms 11. Each side of a stall 21 has a hinged portion 22 that can be swung to either side and locked in position behind the animal that is to be milked.

Located beneath the surface of the platforms 11 but above the level of the support surface 15 are the flues 23. Each flue 23 contains a stainless steel milk line 24 and a vacuum line 30. Ports (not shown) for the attachment of milking equipment (not shown) to the lines 24 and 30 exist for each nook 14. The milking equipment consists of a vacuum line extension and a teat cup assembly and line. During milking, the vacuum line extension is connected to the vacuum line port to supply suction for the teat cup. Milk from the cow flows into the milk line 24 by gravity and suction, the suction being supplied by the same suction pump as supplies the vacuum line 30. Typically, the vacuum pressure required is 12.5-13 inches of Mercury. Because the milk line 24 is disposed beneath the cow and yet above grade, the vacuum pressure required to cause the milk to flow through the milk line 24 to ground level storage tanks is less than in traditional arrangements employing an elevated milk line and ground level stalls. The flue 23 also is disposed forwardly of the hind legs of the cow during milking so that the lines 24 and 30 and the milking equipment are not contaminated by manure. While the flue 23 is removed from the point of accumulation of manure, it is not so far forward that the operator cannot attach the milking equipment to the flue ports and milk the cow from within the nook 14.

A gutter grate 31 runs the length of each of the longitudinal edges 13 of the center alley 12. Positioned directly beneath the gutter grates 31 are the manure gutters 32, which collect the manure falling through the gutter grates 31. Depending from the inward side of the gutter grates 31 are the manure deflectors 33, which ensure that manure falling through the grates 31 falls into the gutters 32.

The center alley 12 is selectively elevatable to a raised position as shown in FIG. 2a, or a lowered position as shown in FIG. 2b. When the center alley 12 is in its raised position, the animals are able to approach or leave the platforms 11 by means of the center alley 12, which is substantially level with the platforms 11. When the center alley 12 is in its lowered position, the alley 12 is lower than the platform 11. The operator is able to milk the animals while he is standing upright when the center alley 12 is in its lowered position.

The means for raising and lowering the floor or center alley 12 includes lift assemblies, generally designated as 34. Each lift assembly 34 consists of a center lift arm 40, two outer lift arms 41, a shaft 42, lift arm shaft bearings 43, lift arm rollers 44 and lift arm stops 50. The center lift arm 40 is centered beneath the center alley 12 and is welded to the shaft 42, which extends outwardly from the center lift arm 40 in both directions. The shaft 42 is held in the lift arm shaft bearings 43; the bearings 43 are mounted on the support surface 15. The outer ends of the shaft 42 are welded to the outer lift arms 41 so that the orientation of the center lift arm 40 with respect to the two outer lift arms 41 is fixed. Mounted on the outer ends of each of the outer lift arms 41 are the lift arm rollers 44. Affixed to the bottom of the center alley 12 and in the same plane as the plane of rotation of the outer lift arms 41 are the lift arm stops 50.

Two oppositely facing hydraulic rams 51 are pivotally mounted on either side of the longitudinal center of the support surface 15 and beneath the center alley 12. The rams 51 are arranged in parallel with a hydraulic control valve (not shown) that is connected to an air reservoir (not shown). Operation of the rams 51 is by means of compressed air which provides pressure to an oil system (not shown) in a conventional manner. Each ram 51 is pivotally connected to a lift arm power linkage 52: one of the power linkages 52 extends forwardly from the hydraulic ram 51 to which it is connected; the other power linkage 52 extends rearwardly from the ram 51 to which it is connected. The forwardly and rearwardly facing power linkages 52 are pivotally connected to the forwardly and rearwardly disposed center lift arms 40, respectively, so that an extension of the piston portion of the hydraulic ram 51 causes a longitudinal displacement of the associated power linkage 52, which in turn rotates the outer lift arms 41 in an upward direction, raising the center alley 12. The tracks 53 extend the length of the bottom surface of the center alley 12 and provide a surface on which the lift arm rollers 44 move as the center alley 12 is raised or lowered. The center alley 12 also is guided by the laterally disposed guide rollers 54 as the center alley 12 is raised or lowered vertically.

The operation of the apparatus for a dairy barn begins with the center alley 12 in its raised position. The milking procedure commences with the cattle or other animals being moved across the center alley 12 onto the fixed platforms 11 and into the individual stalls 21. Once the cattle are properly positioned in stalls 21, the center alley 12 is lowered by releasing the pressure stored in the hydraulic rams 51. Once the center alley 12 has reached its lowered position, the operator is able to move into the center alley 12 and the milking nooks 14. As he moves into a nook 14, he removes the nook cover 20, swings the hinged partitions 22 behind the cow, attaches the milking equipment to the cow, moves out of the nook 14 and replaces the nook cover 20. The operator normally proceeds down one row of stalls and up the other row using the same procedure. Once the milking of all of the cattle in the stalls 21 has been completed, the milking equipment is removed and the center alley 12 is again raised and the cattle are herded out of the stalls 21 across the center alley 12 and out of the dairy barn.

Although the preferred embodiment has been described in detail, it is contemplated that various modifications could be made to the structure of the preferred embodiment by those skilled in the art without deviating from the spirit or scope of the present invention. For example, the dairy barn could be constructed with two adjacent rows of center-facing stalls and side alleys. The side alleys could be elevated as already described or could be hinged to the barn walls and raised with a hoist system. Similarly, the center alley of the preferred embodiment could be raised and lowered with a chain hoist, cable hoist or alternate pneumatic or hydraulic system. Accordingly, the scope of the present invention should not be dictated by the description of the preferred embodiment.

We claim:

1. An apparatus used in a dairy barn that facilitates access to the dairy animals for milking, which comprises:
   a. a fixed platform on which the animals stand during milking, the platform having a configuration that allows the operator to position himself to milk the animals;
   b. a fixed support surface adjacent and lower than the platform;
   c. a floor adjacent the platform and above the support surface that is selectively elevatable between a raised position in which the floor is substantially level with the platform so that the animals are able to approach or leave the platform by means of the floor, and a lowered position in which the floor is lower than the platform so that the operator is able to milk the animals while he is standing substantially upright;
   d. means for raising and lowering the floor;
   e. a plurality of adjacent stalls mounted on the platform for restraining the animals on the platform with the rear of the animal directed toward the floor while they are being milked; and
   f. a plurality of milking nooks recessed along the length of the platform and opening toward and adjacent the floor, thereby allowing the operator access to the nook from the floor and milking access to two stalls from a single nook.

2. The apparatus of claim 1, and removable nook covers disposed over the milking nooks.

3. The apparatus of claim 2, wherein the floor comprises a center alley between two platforms.

4. The apparatus of claim 3, wherein the floor contains a gutter grate along each of its longitudinal edges, and the apparatus further comprises
   a. a manure gutter disposed beneath each gutter grate and adjacent and below the level of the support surface; and
   b. manure deflectors disposed to ensure that manure falling through each gutter grate enters the manure gutters.

5. The apparatus of claim 2, wherein the floor contains a gutter grate adjacent the platform, and the apparatus further comprises
   a. a manure gutter disposed beneath the gutter grate and adjacent and below the level of the support surface; and
   b. manure deflectors disposed to ensure that manure falling through each gutter grate enters the manure gutters.

6. The apparatus of claim 4 or 5, wherein the means for raising and lowering the floor includes
   a. a plurality of lift assemblies that comprise
      (1) a center lift arm,
      (2) two outer lift arms,
      (3) a shaft to which the center and outer lift arms are welded at a fixed angle with respect to each other,
      (4) lift arm shaft bearings mounted on the support surface and in which the shaft is mounted,
      (5) lift arm rollers rotatably attached to the free ends of the outer lift arms, and
      (6) lift arm stops affixed to the bottom of the floor;
   b. a hydraulic ram pivotally mounted at its base to the support surface; and
   c. a lift arm power linkage pivotally connected to the center lift arm of each assembly that is located to one side of the lift arm power linkage, one end of the lift arm power linkage being pivotally connected to the hydraulic ram so that the floor may be selectively elevated by the outer lift arms in response to the movement of the lift arm power linkage by the hydraulic ram, the upper position of the floor being limited by the lift arm stops.

7. The apparatus of claim 6, wherein the means for raising and lowering the floor includes
   a. tracks secured to the bottom of the floor to guide the lift arm rollers; and
   b. laterally disposed guide rollers extending from the bottom of the floor to guide the floor as it is raised and lowered vertically.

8. The apparatus of claim 7, further comprising a flue accessible from the milking nook disposed beneath the platform and above the support surface in front of the animal's hind legs during milking so that the milk line and vacuum line are not contaminated by manure and a milk line and a vacuum line disposed in the flue.

9. The apparatus of claim 1, further comprising a flue accessible from the milking booth disposed beneath the platform and above the support surface in front of the animal's hind legs during milking so that the milk line and vacuum line are not contaminated by manure and a milk line and a vacuum line disposed in the flue.

* * * * *